(12) United States Patent
Waddington et al.

(10) Patent No.: US 11,379,408 B2
(45) Date of Patent: Jul. 5, 2022

(54) POINTER-BASED DYNAMIC DATA STRUCTURES IN KEY-VALUE STORES

(71) Applicant: International Business Machines Corporation, Armonk, NY (US)

(72) Inventors: Daniel Waddington, Morgan Hill, CA (US); Luna Xu, San Jose, CA (US); Clement Lambert Dickey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 235 days.

(21) Appl. No.: 16/866,234

(22) Filed: May 4, 2020

(65) Prior Publication Data

US 2021/0342293 A1  Nov. 4, 2021

(51) Int. Cl.
*G06F 16/00* (2019.01)
*G06F 16/11* (2019.01)
(Continued)

(52) U.S. Cl.
CPC .......... *G06F 16/119* (2019.01); *G06F 9/5016* (2013.01); *G06F 12/0238* (2013.01); *G06F 12/1081* (2013.01); *G06F 16/164* (2019.01); *G06F 16/182* (2019.01); *G06F 16/2246* (2019.01)

(58) Field of Classification Search
CPC .... G06F 16/119; G06F 16/164; G06F 16/182; G06F 9/5016; G06F 12/1081
See application file for complete search history.

(56) References Cited

U.S. PATENT DOCUMENTS

| 6,363,468 B1* | 3/2002 | Allison | G06F 12/023 711/171 |
| 8,209,510 B1* | 6/2012 | Thathapudi | G06F 21/60 711/171 |

(Continued)

FOREIGN PATENT DOCUMENTS

| EP | 2024825 A2 | 2/2009 |
| WO | 2008017204 A1 | 2/2008 |

OTHER PUBLICATIONS

Graefe et al., "In-Memory Performance for Big Data," Proceedings of the VLDB Endowment, vol. 8, No. 1, 2014, pp. 37-48.

(Continued)

*Primary Examiner* — Diedra McQuitery
(74) *Attorney, Agent, or Firm* — Zilka-Kotab, P.C.

(57) ABSTRACT

A computer-implemented method includes receiving data structures in memory space and creating micro-heaps on a per-data structure basis. Each data structure is associated with a micro-heap allocator. The method also includes storing the data structures in a key-value store. Values of the key-value store are associated with the data structures. A computer program product includes one or more computer readable storage media, and program instructions collectively stored on the one or more computer readable storage media. The program instructions include program instructions to perform the foregoing method. A system includes a processor and logic integrated with the processor, executable by the processor, or integrated with and executable by the processor. The logic is configured to perform the foregoing method.

20 Claims, 7 Drawing Sheets

(51) Int. Cl.
  *G06F 16/182* (2019.01)
  *G06F 9/50* (2006.01)
  *G06F 12/1081* (2016.01)
  *G06F 16/16* (2019.01)
  *G06F 16/22* (2019.01)
  *G06F 12/02* (2006.01)

(56) References Cited

U.S. PATENT DOCUMENTS

| | | | |
|---|---|---|---|
| 8,538,977 | B2 | 9/2013 | Lee et al. |
| 9,086,950 | B2 | 7/2015 | Assarpour |
| 9,229,869 | B1* | 1/2016 | Parakh ............... G06F 11/1441 |
| 9,530,006 | B2 | 12/2016 | Troeger et al. |
| 9,934,246 | B2 | 4/2018 | Raja et al. |
| 10,198,352 | B2 | 2/2019 | Subrahmanyam et al. |
| 10,216,637 | B2 | 2/2019 | Ergan et al. |
| 10,360,149 | B2 | 7/2019 | Marathe et al. |
| 10,802,984 | B2 | 10/2020 | Sanjeepan et al. |
| 10,817,421 | B2 | 10/2020 | Talagala et al. |
| 10,817,502 | B2 | 10/2020 | Talagala et al. |
| 2006/0123046 | A1 | 6/2006 | Doise et al. |
| 2006/0265438 | A1* | 11/2006 | Shankar ............... G06F 12/0253 |
| 2011/0153644 | A1* | 6/2011 | Kosuru .................. G06F 16/24 707/769 |
| 2011/0289052 | A1* | 11/2011 | Rambacher ........... G06F 16/162 707/624 |
| 2013/0346378 | A1* | 12/2013 | Tsirogiannis ......... G06F 12/023 707/693 |
| 2017/0048253 | A1* | 2/2017 | Anton .................... H04L 63/20 |
| 2018/0336140 | A1* | 11/2018 | Guddekoppa ....... G06F 12/0246 |
| 2019/0347211 | A1 | 11/2019 | Bortnikov et al. |
| 2020/0057781 | A1* | 2/2020 | McCormick ............ G06F 16/86 |

OTHER PUBLICATIONS

GitHub, "Memory Centric Active Storage," GitHub, Inc., 2020, 2 pages.
IBM, "Heap Memory Manager," IBM Knowledge Center, 3 pages, retrieved from https://www.ibm.com/support/knowledgecenter/en/ssw_ibm_i_72/rtref/heap_memory_manager.htm on Mar. 5, 2020.
Wikipedia, "Memory management," Wikipedia, Feb. 2020, pp. 1-7, retrieved from https://en.wikipedia.org/wiki/Memory_management.
Wikipedia, "Redis," Wikipedia, Feb. 2020, pp. 1-6, retrieved from https://en.wikipedia.org/wiki/Redis.
Redis, "Introduction to Redis," Redis, 2 pages, retrieved from https://redis.io/topics/introduction on Mar. 5, 2020.
Berger et al., "Reconsidering Custom Memory Allocation," Proceedings of the 17th ACM SIGPLAN conference on Object-oriented programming, systems, languages, and applications, Nov. 2002, pp. 1-12.
Venkataraman et al., "Consistent and Durable Data Structures for Non-Volatile byte-Addressable Memory," USENIX Conference on File and Storage Technologies, Feb. 2011, pp. 1-15, retrieved from https://static.usenix.org/event/fast11/tech/full_papers/Venkataraman.pdf.
Yang et al., "NV-Tree: Reducing Consistency Cost for NVM-based Single Level Systems," Proceedings of the 13th USENIX Conference on File and Storage Technologies (FAST '15), Feb. 2015, pp. 167-181.
Oukid, et al., "FPTree: A Hybrid SCM-DRAM Persistent and Concurrent B-Tree for Storage Class Memory," SIGMOD' 16, Jun. 2016, 16 pages.
Moraru, et al., "Consistent, Durable, and Safe Memory Management for Byte-addressable Non Volatile Main Memory," TRIOS' 13, Nov. 2013, 17 pages.
Bhandari, et al., "Makalu: Fast Recoverable Allocation of Non-volatile Memory," OOPSLA' 16, Nov. 2016, pp. 677-694.
Coburn et al., "NV-Heaps: Making Persistent Objects Fast and Safe with Next-Generation, Non-Volatile Memories," ASPLOS' 11, Mar. 2011, 13 pages.
Wikipedia, "Demand paging," Wikipedia, Feb. 2020, 2 pages, retrieved from https://en.wikipedia.org/wiki/Demand_paging.
Wilson et al., "Dynamic Storage Allocation: A Survey and Critical Review," University of Texas, Department of Computer Sciences, 1995, pp. 1-78, retrieved from https://users.cs.northwestern.edu/~pdinda/icsclass/doc/dsa.pdf.
Kemper et al., "Adaptable Pointer Swizzling Strategies in Object Bases: Design, Realization, and Quantitative Analysis," VLDB Journal, vol. 4, 1995, pp. 519-566.
Kim et al., "clfB-tree: Cacheline Friendly Persistent B-tree for NVRAM," ACM Transactions on Storage, vol. 14, No. 1, Feb. 2018, pp. 5:1-5:17.
Waddington, D., U.S. Appl. No. 17/521,515, filed Nov. 8, 2021.
Khan et al., "MOSIQS: Persistent Memory Object Storage With Metadata Indexing and Querying for Scientific Computing," IEEE Access, vol. 9, Jun. 2021, pp. 85217-85231.
Memaripour et al., "Breeze: User-Level Access to Non-Volatile Main Memories for Legacy Software," IEEE 36th International Conference on Computer Design, 2018, pp. 413-422.
Ye et al., "Supporting Legacy Libraries on Non-Volatile Memory: A User-Transparent Approach," ACM/IEEE 48th Annual International Symposium on Computer Architecture (ISCA), 2021, pp. 443-455.
Hoseinzadeh et al., "Corundum: Statically-Enforced Persistent Memory Safety," Proceedings of the 26th ACM International Conference on Architectural Support for Programming Languages and Operating Systems (ASPLOS), Apr. 2021, pp. 429-442.
Waddington et al., "PyMM: Heterogeneous Memory Programming for Python Data Science," Woodstock, Jun. 2018, 7 pages.
Anonymous, "NIST Cloud Computing Program," NIST, Information Technology Laboratory, Nov. 13, 2013, pp. 1-2, retrieved from www.nist.gov/itl/cloud/.
Mell et al., "The NIST Definition of Cloud Computing," Recommendations of the National Institute of Standards and Technology, NIST Special Publication 800-145, Sep. 2011, pp. 1-7.
CSRC, "Cloud Computing," Computer Security Resource Center, Oct. 2017, 3 pages, retrieved from https://csrc.nist.gov/projects/cloud-computing.
pmem.io, "Persistent Memory Programming," pmem.io, 7 pages, retrieved on Oct. 29, 2021, from https://pmem.io/pmdk/.
PyNVM, "PyNVM: A Python Interface to PMDK," pynvm, 2016, 2 pages, retrieved from https://pynvm.readthedocs.io/en/v0.3.1/.
Apache, "Apache Arrow," The Apache Software Foundation, 2021, 2 pages, retrieved from https://arrow.apache.org/.
CXL, "Compute Express Link: The Breakthrough CPU-to-Device Interconnect," CXL, 2020, 3 pages, retrieved from https://www.computeexpresslink.org/.
GitHub, "The Python programming lamguage," GitHub, 2021, 11 pages, retrieved from https://github.com/python/cpython.
NumPy, "The fundamental package for scientific computing with Python," NumPy, 2021, 3 pages, retrieved from https://numpy.org/.
Python, "Python/C API Reference Manual," Python Software Foundation, 2021, 3 pages, retrieved from https://docs.python.org/3/c-api/index.html.
PyTorch, "From Research to Production," PyTorch, 2021, 5 pages, retrieved on Oct. 29, 2021, from https://pytorch.org/.
TIOBE, "TIOBE Index for Oct. 2021," TIOBE Software BV, 2021, 7 pages, retrieved from http://tiobe.com/tiobe-index.
Rahm, E, "Logging and Recovery," Encyclopedia of Database Systems. Springer, 2009, 3 pages.
Waddington et al., "An Architecture for Memory Centric Active Storage (MCAS)," arXiv, May 2021, 17 pages.
Mell et al., "The NIST Definition of Cloud Computing," NIST Publications, Sep. 28, 2011, 2 pages, retrieved from https://www.nist.gov/publications/nist-definition-cloud-computing.

\* cited by examiner

POINTER-BASED DYNAMIC DATA STRUCTURES IN KEY-VALUE STORES

BACKGROUND

The present invention relates to key value stores, and more specifically, this invention relates to heap managers on a per-data structure basis for storage in key-value stores.

Key-value stores are data storage paradigms designed for storing, retrieving, and managing associative arrays and data structures. The data structures comprise a collection of objects, records, fields, etc., containing data. The foregoing elements may be stored and/or retrieved using a key that uniquely identifies the element to find data within the database. Keys (e.g., of variable length) are used to store (e.g., PUT) and/or retrieve (e.g., GET) values from durable storage. Value data is opaque (e.g., no structure is enforced).

SUMMARY

A computer-implemented method, according to one embodiment, includes receiving data structures in memory space and creating micro-heaps on a per-data structure basis. Each data structure is associated with a micro-heap allocator. The method also includes storing the data structures in a key-value store. Values of the key-value store are associated with the data structures.

A computer program product, according to one embodiment, includes one or more computer readable storage media, and program instructions collectively stored on the one or more computer readable storage media. The program instructions include program instructions to perform the foregoing method.

A system, according to another embodiment, includes a processor and logic integrated with the processor, executable by the processor, or integrated with and executable by the processor. The logic is configured to perform the foregoing method.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods, and computer program products for using micro-heaps to support using pointer-based dynamic data structures as values to be saved in key-value stores without the need to serialize the data into a different format.

In one general embodiment, a computer-implemented method includes receiving data structures in memory space and creating micro-heaps on a per-data structure basis. Each data structure is associated with a micro-heap allocator. The method also includes storing the data structures in a key-value store. Values of the key-value store are associated with the data structures.

In another general embodiment, a computer program includes one or more computer readable storage media, and program instructions collectively stored on the one or more computer readable storage media. The program instructions include program instructions to perform the foregoing method.

In another general embodiment, a system includes a processor and logic integrated with the processor, executable by the processor, or integrated with and executable by the processor. The logic is configured to perform the foregoing method.

Figure 1:
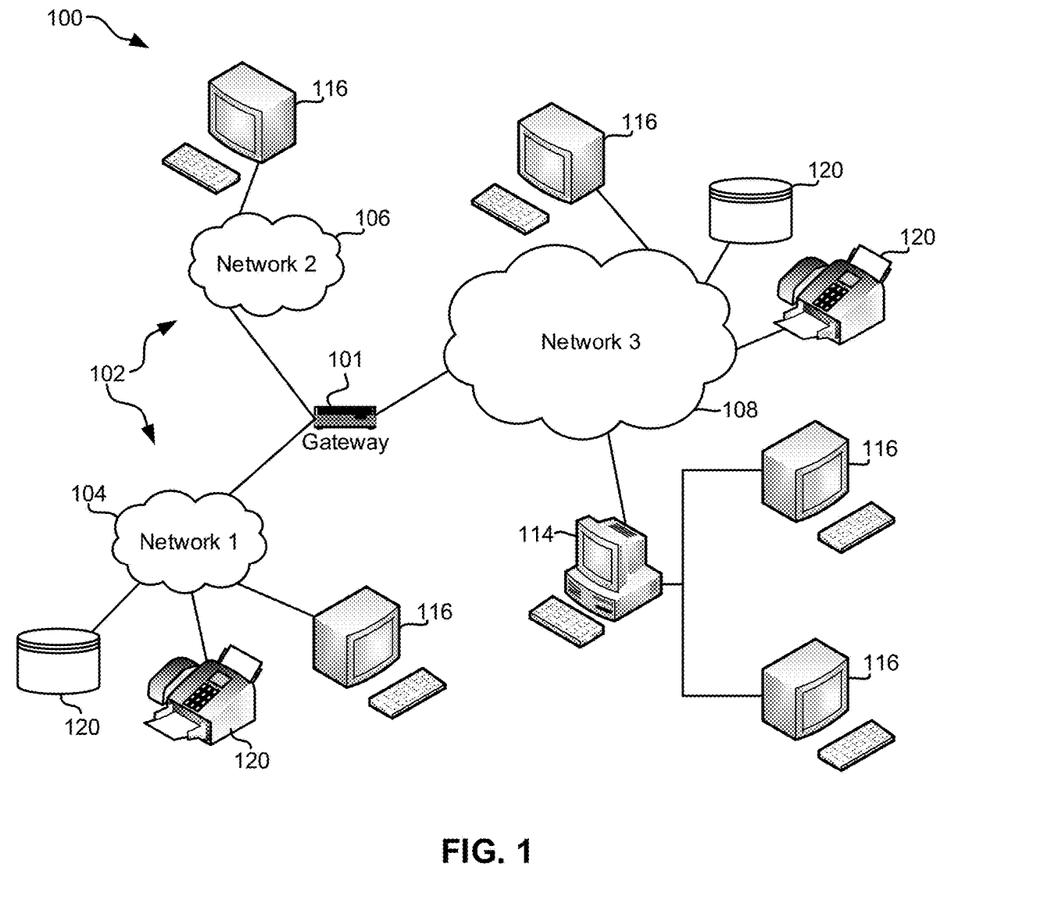
FIG. 1 illustrates a network architecture, in accordance with one embodiment of the present invention.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer, or any other type of logic. It should be noted that a user device 116 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX® system which emulates an IBM® z/OS® environment, a UNIX® system which virtually hosts a Microsoft® Windows® environment, a Microsoft® Windows® system which emulates an IBM® z/OS® environment, etc. This virtualization and/or emulation may be enhanced through the use of VMware® software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
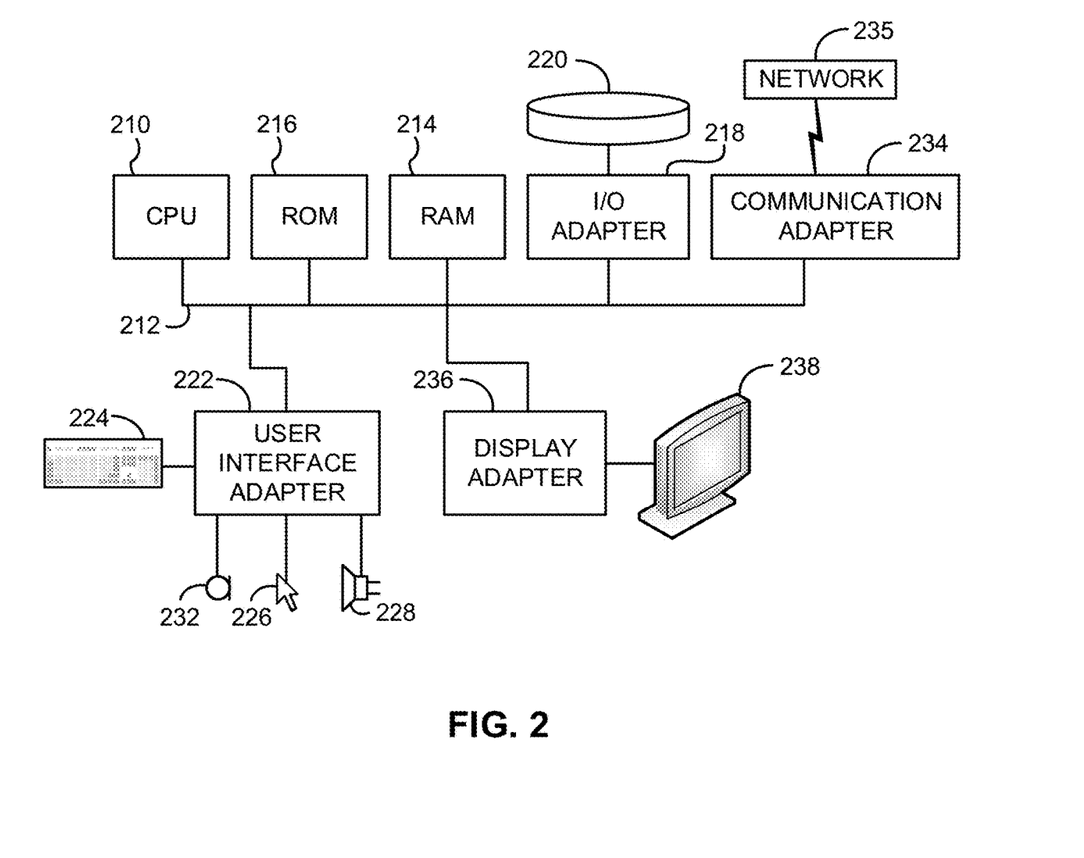
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a macOS®, a UNIX® OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
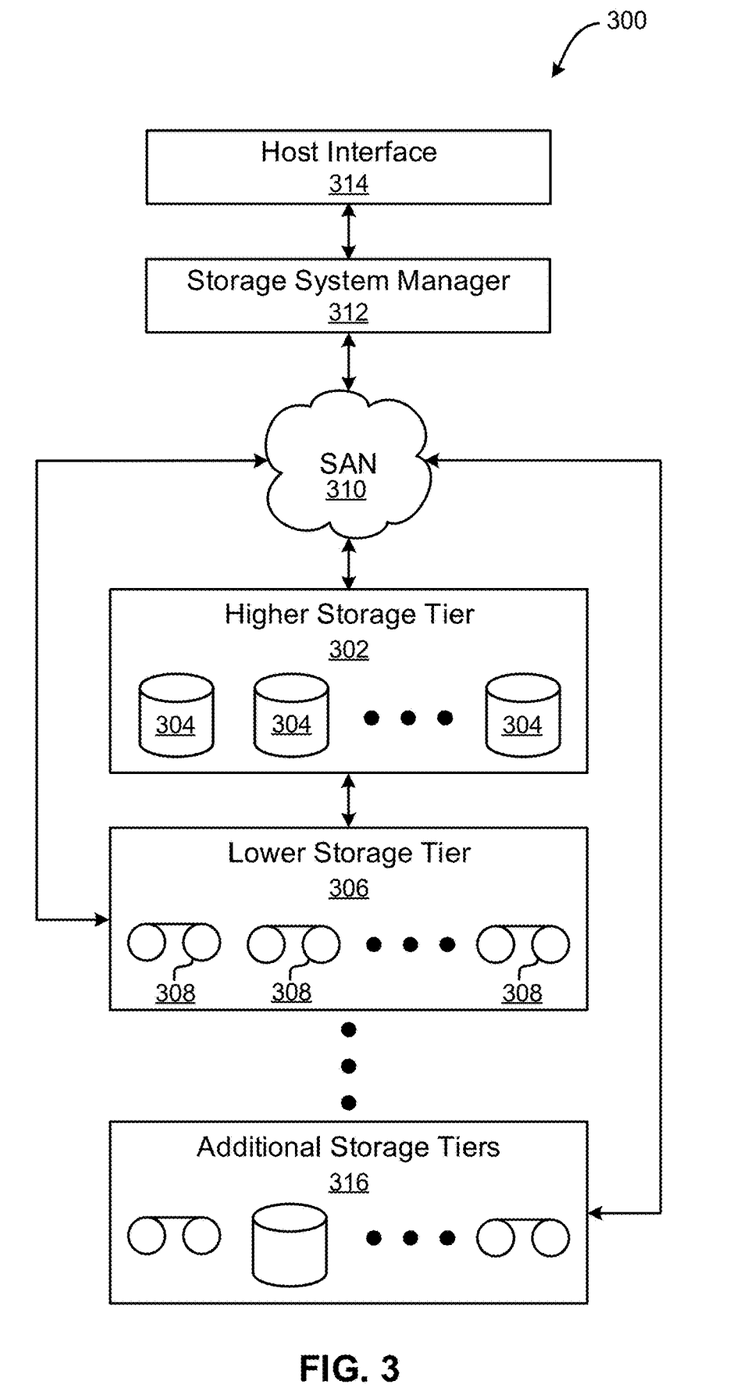
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Modern applications require key-value stores to be able to perform operations on data other than simply serving as data warehouses and caches. There exists a need for key-value stores which understand data semantics that cannot be achieved by storing only opaque "blob" type data values in traditional key-value stores. Redis® (e.g., a structured data cache) attempts to keep structured data. Redis® supports simple, pre-defined dynamic data structures (e.g., lists) to allow applications to push customized operations to the supported data structures. However, these pre-defined data structures are not as flexible as "true" dynamic data structures used directly in programming languages such as C++ (e.g., Standard Template Libraries), which support arbitrary operations on arbitrary data structures. The foregoing arbitrary data structures are challenging and costly to support with pointers which are understood by applications and storage. For example, shipping arbitrary data structures over the network involves a high serialization and deserialization overhead that negatively impacts the high throughput and latency requirement of key-value stores. Redis® only supports string data types in containers to reduce the foregoing costs.

Redis® supports pre-defined data structures as strings, hashes, lists, sets, etc., and sets of operations on these structures. The Redis® design is limited by the structures and operations that can be performed. Redis® does not support arbitrary data types by default. Specifically, only string types are supported for each container to reduce serialization and/or deserialization complexities. Users can plugin customized data structures, but they need to provide their own serialization and/or deserialization methods.

A document-oriented (e.g., in-memory) database is a specialized key-value store. Examples of document-oriented databases include Redis® and Couchbase®. Both provide creation (or insertion), retrieval (or query, search, read, or find), update (or edit), and deletion (or removal). Data is structured and not opaque. Document-oriented databases use standard formats and data models without pointers. However, structured data models are different from programming data models, thereby requiring serialization and deserialization.

Most programming languages and runtime environments (e.g., libc) manage memory on a per-process basis. The "heap" provides the ability for a program to allocate and free a variable length, contiguous region (e.g., at least in virtual space) of memory. The heap is considered to perform dynamic memory management. There are many designs of heap allocators that, in general, strive to optimize performance (e.g., thread scaling), reduce wasted memory (e.g., memory that cannot be allocated), and minimize fragmentation (e.g., unusable holes).

Most operating systems today (e.g., Linux) deploy heap memory managers as a part of the application's process (e.g., in addition to the kernel process). Importantly, all data structures in the process share the same allocator.

In stark contrast, various preferred embodiments disclosed herein include a method using "micro-heaps" to support using pointer-based dynamic data structures as values to be saved in the key-value store without the need to serialize the data into a different format. The absence of serialization in the various embodiments disclosed herein allow complex, dynamic data structures such as trees, graphs, etc., to be copied from a programming environment to the key-value store without traversing the data structures and/or converting the form of the data structures. At least some of the embodiments disclosed herein for computing pointer-based forms (e.g., using legacy container classes and/or methods) may be applied directly to the data in the key-value store. An important advantage provided by the operations described herein includes achieving data replication (e.g., for high availability and high resiliency) with low overhead compared to conventional data replication techniques and achieving seamless operation on data in storage.

As referred to throughout the present disclosure, data structures may refer to arrays, stacks, queues, linked lists, trees, graphs, hash tables, etc., or any combination thereof. Logical grouping may refer to logical groupings of data structures. For example, a logical grouping may comprise a group of data structures that are associated by type (e.g., strings, lists, etc.).

Figure 4:
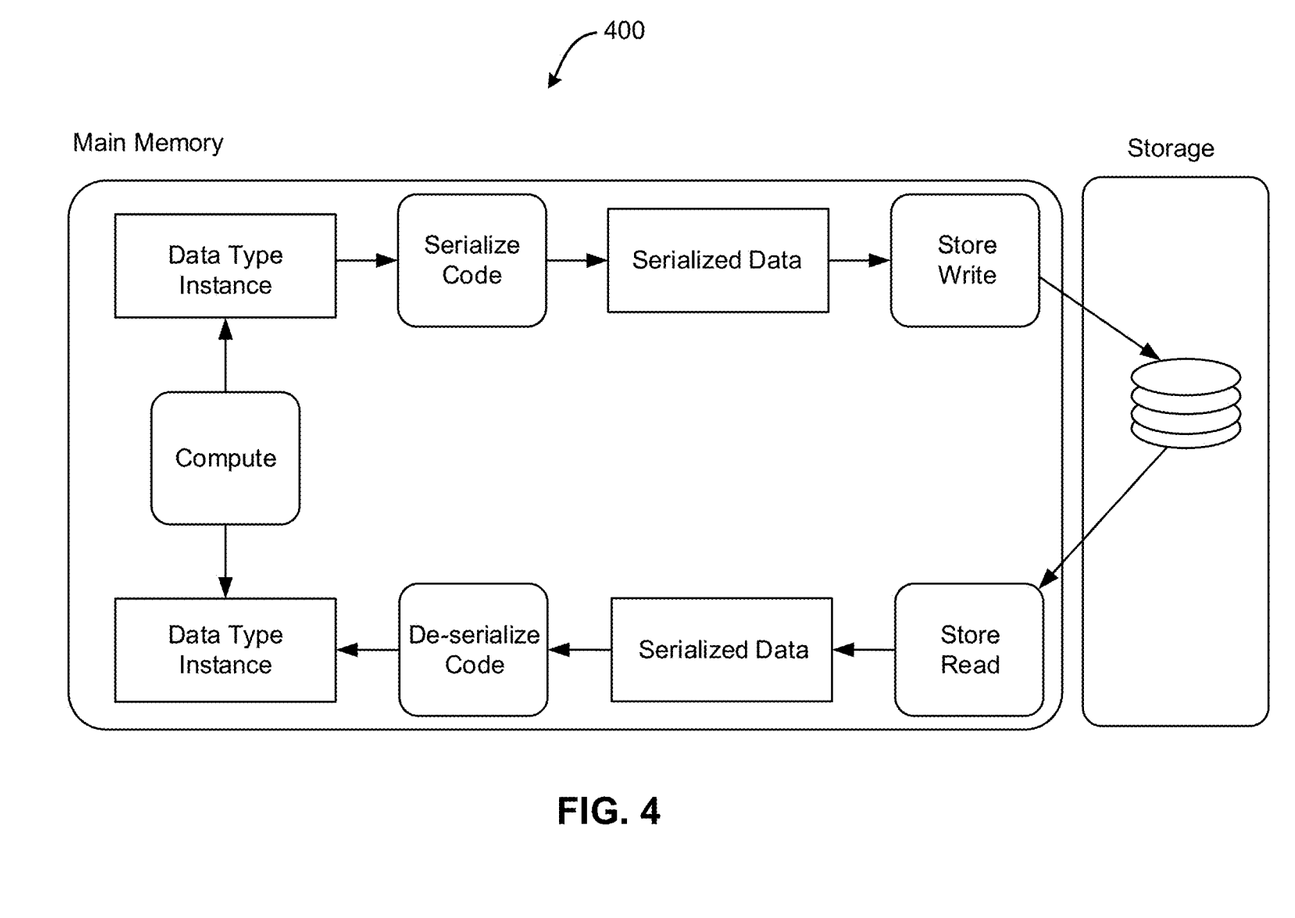
FIG. 4 illustrates a representative architecture having built-in serialization capabilities.

FIG. 4 is a representative architecture 400 having built-in serialization capabilities. In such a computing system, data structures are instantiated and operated on in the system's main memory (Main Memory). Saving and restoring data structures to and/or from storage media and/or transporting the data structures across networks traditionally require serialization into Serialized Data and deserialization from Serialized Data (e.g., also referred to as marshalling/de-marshalling). See Serialize Code and De-serialize Code. To perform serialization, a program conventionally converts a memory-based representation of data (e.g., data bytes, pointers, addresses, etc.) into a form that is stored and transmitted (Serialized Data). Principally, the conversion requires identifying what areas of memory "belong" to a data-structure (see Data Type Instance) and saving the type information with data bits (e.g., 32-bits is an integer in big-endian format) (see Store Write and Store Read). For example, to serialize a pointer-based tree data structure, a complete tree and records pointers must be traversed, as well as value types and value data. Many programming languages provide explicit services for serialization (e.g., Python pickling, .NET serializers) and/or support for building serialization functions (e.g., Java java.io.Serializable).

With continued reference to FIG. 4, in one exemplary use case of the architecture depicted in FIG. 4, an item is added to a list by deserializing the data (e.g., the data to be added and/or the data in the list), opening the list, adding the item to the list, reserializing the data in the list with the new item, and pushing the list with the new item back into a key-value store (Storage). For a single update (e.g., adding an item), two round trips are required to get the data and then to return the updated data to the key-value store, as shown.

While programming language built-in serialization capabilities are the most commonly adopted approach, there are also solutions based around the specification and complication of an abstract data type interface (e.g., Google® Flat Buffers, Protocol Buffers). In this case, the data structure is specified using a specialized descriptor language that is compiled to generate source code for serialization and deserialization. This generated code may be integrated into a program directly. The foregoing approaches are relatively costly and slow for large data structure (e.g., multi-tera-bytes) serialization. Partial modifications require complete re-serialization in these foregoing approaches.

At least some of the embodiments of the present disclosure eliminate serializing and deserializing data structures.

Various embodiments may be used in conjunction with persistent memory technologies.

Conventionally, data values in key-value stores are opaque and/or have simple (e.g., pointer-less) structure. Tracking all pointer relations and associated memory in a global memory manager is challenging and complex. At least some embodiments of the present disclosure include a key-value store architecture that supports arbitrary pointer-based data structures as values. The complexity of tracking all pointer relations and associated memory in a global memory manager are addressed in the disclosed embodiments by the deployment of heap managers (e.g., micro-heap allocators) on a per-data structure basis in preferred embodiments.

As referred to throughout the present disclosure, serialization and/or deserialization refers to serialization and/or deserialization of data structures, data of the data structures, data structures in a logical grouping, data of data structures in a logical grouping, etc. Serialization and/or deserialization may refer to any process of translating data structure(s) into a format that is stored (e.g., in memory) and/or transmitted (e.g., across a network) to be reconstructed later (e.g., possibly in another computing environment).

Figure 5:
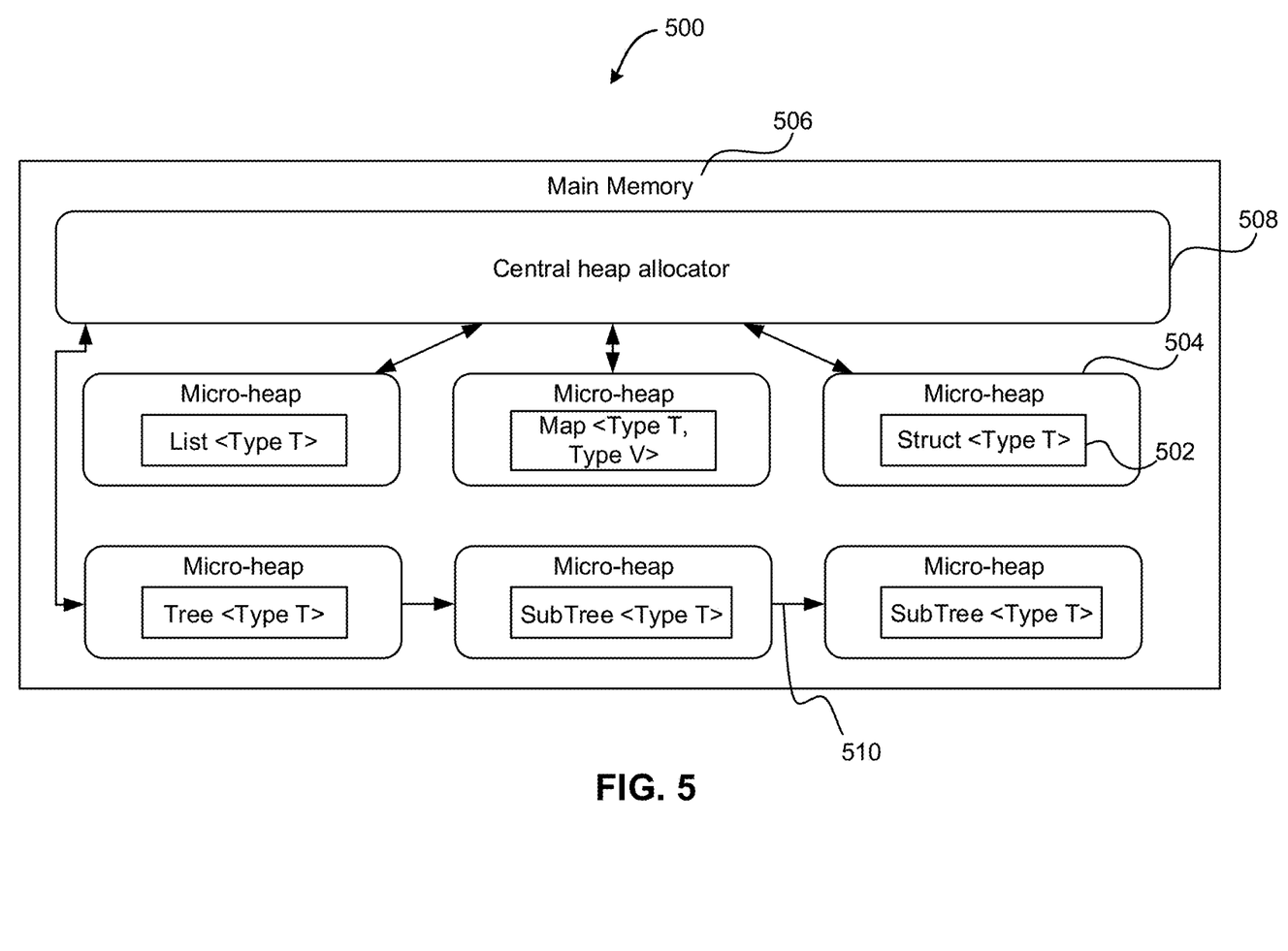
FIG. 5 illustrates a high-level architecture, in accordance with one embodiment of the present invention.

FIG. 5 depicts a high-level architecture 500, in accordance with one embodiment. As an option, the present high-level architecture 500 may be implemented in conjunction with features from any other embodiment listed herein, such as those described with reference to the other FIGS. Of course, however, such high-level architecture 500 and others presented herein may be used in various applications and/or in permutations which may or may not be specifically described in the illustrative embodiments listed herein. Further, the high-level architecture 500 presented herein may be used in any desired environment.

Each data structure 502 instance and/or logical group is associated with an individual micro-heap allocator 504 (e.g., memory heap manager). Micro-heap allocators 504 are heap allocators for each individual or logical grouping of data structures as described in detail below. In various embodiments presented throughout the disclosure, a "micro-heap" may collectively refer to the micro-heap allocator and the associated data structure. In preferred embodiments, each data structure 502 is isolated and uses "its own" allocator (e.g., micro-heap allocator 504) which is not shared with other data structures. The micro-heap allocators 504 are configured to act as heap allocators for the individual data structures 502. The micro-heap allocators 504 are configured for use in volatile and/or persistent memory management. In some approaches, a micro-heap allocator may be an allocator for a logical grouping (not shown). The logical grouping may be a logical grouping of data structures by type (e.g., arrays, stacks, queues, linked lists, trees, graphs, hash tables, etc.) in some approaches. Logical groupings may be referred to as secondary micro-heaps as used throughout the present disclosure.

In various embodiments, micro-heaps are expanded by linking 510 together the micro-heap allocators 504. For example, one data structure 502 may reference other data structures 502 by linking 510 together the micro-heap allocators 504. In one approach, the operation system lazy paging mechanism (not shown) links together the micro-heaps by deferring initialization of operation(s) on the data structures until the point in time at which the operation(s) are demanded and/or swapping the operation(s) demanded by the process.

The micro-heap allocators 504 may be used to relocate the associated data structure 502 by relocating the micro-heap allocator 504 and maintaining a virtual map address. In a preferred embodiment, the micro-heap allocators 504 are loaded into the same region of the virtual main memory 506. Memory may be provided to micro-heaps and associated micro-heap allocators 504 in the form of coarse-grained chunks in some approaches. New coarse-grained allocations may be added by linking together micro-heap allocators 504.

All of the memory used by a single data structure 502 is allocated by the micro-heap allocator 504 associated with the data structure 502, in at least some approaches. For example, by saving memory managed (e.g., used) by the micro-heap and the respective manager metadata, the data structure is effectively saved. Specifically, relocating the data includes relocating the managed memory (e.g., memory managed by the micro-heap allocator associated with the data) and the micro-heap allocator state itself. Furthermore, relocating the memory managed by the micro-heap allocator and the state of the micro-heap allocator includes the ability to copy and relocate the underlying data structure without serialization and/or deserialization.

A high-level architecture 500 preferably includes a central heap allocator 508. A central heap allocator 508 may be any known, globally shared allocator which manages the whole heap space (e.g., the main memory, in some embodiments) in accordance with conventional management techniques. The central heap allocator 508 may assign coarse-grained spaces for each micro-heap allocator to manage according to the various embodiments described herein. In preferred approaches, the micro-heap allocators 504 receive memory from the central heap allocator 508. In response to detecting that a micro-heap allocator runs out of memory (e.g., no memory, insufficient memory for storing a data structure, a threshold amount of memory set by a user, a manufacturer, a default setting, etc., etc.), the central heap allocator allocates memory (e.g., physical and/or logical) to the micro-heap allocator. In other approaches, the micro-heap allocator alerts the central heap allocator that the micro-heap allocator is out of memory such that the central heap allocator allocates memory to the micro-heap allocator.

Figure 6:
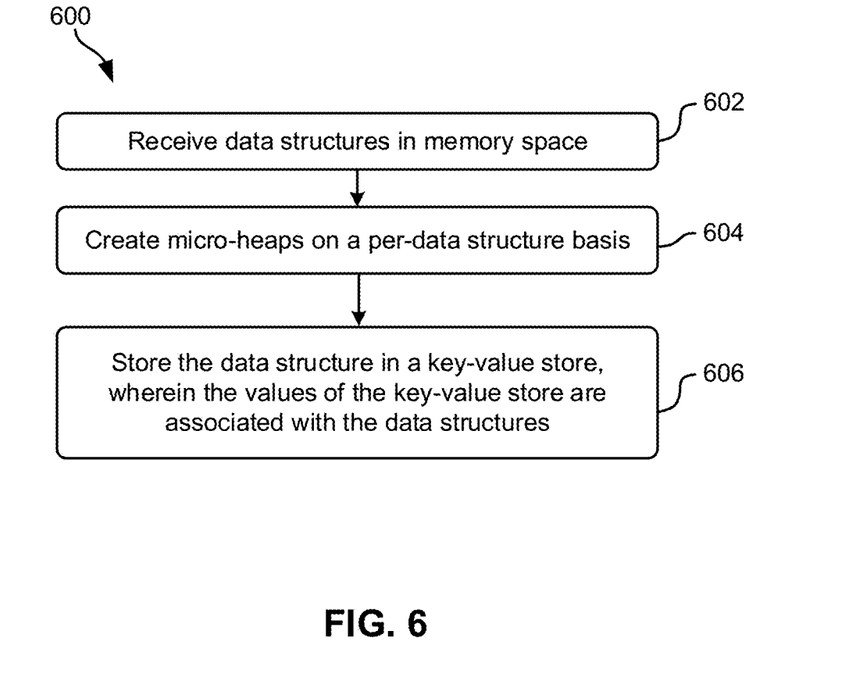
FIG. 6 illustrates a flowchart of a method, in accordance with one embodiment of the present invention.

Now referring to FIG. 6, a flowchart of a method 600 is shown according to one embodiment. The method 600 may be performed in accordance with the present invention in any of the environments depicted in FIGS. 1-5 and 7, among others, in various embodiments. Of course, more or fewer operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by computers, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 6, method 600 includes operation 602. Operation 602 includes receiving data structures in memory space. Data structures may be received in any manner known in the art in view of the present disclosure. Memory space may refer to logical memory space, physical memory space, volatile memory, persistent memory, etc., or any combination thereof.

Operation 604 includes creating micro-heaps on a per-data structure basis. In various embodiments, each data structure is isolated and associated with an individual micro-heap allocator. The data structure and the associated micro-heap allocator state may collectively be referred to as a micro-heap throughout the present disclosure. In preferred embodiments, the individual micro-heap allocators are not shared between the data structures. Each data structure may be isolated by a tree, a map, etc.

In preferred embodiments, the micro-heap allocators are configured for memory management. The micro-heap allocator may comprise characteristics of any heap allocator design known in the art. Each data structure is preferably associated with an individual micro-heap allocator. The micro-heap allocator design for each data structure may be unique (e.g., custom) for each data structure in various approaches. In some embodiments, all of the micro-heap allocators may have the same allocator design.

In various approaches, an allocator design for each micro-heap allocator may be assigned depending on the type of data structure associated therewith. In a preferred embodiment, suitable micro-heap allocator designs are those which do not anticipate a large number of allocations. For example, preferred micro-heap allocator designs reduce the ratio of data structure to micro-heap to 1, thereby including only a relatively small number of allocations compared to a conventional central heap allocator which manages an entire memory space comprising all the data structures. In some approaches, the choice of micro-heap allocator design may leverage known characteristics of the data allocation and/or free requirements.

In preferred embodiments, memory associated with the data structure and meta-data associated with the micro-heap allocator are stored in one contiguous region of memory. A memory space may be maintained which includes meta-data memory space and allocated data memory space (e.g., for the data structures) in a contiguous region of the memory space. The contiguous region of memory space preferably uses data transfers from direct memory access (DMA) and/or remote direct memory access (RDMA). Various embodiments of the present disclosure enable zero memory transfers where relocating and/or copying the data structures does not include serializing. The memory may be relocated without converting the data in the data structures and may be supplied to a key-value store. The managed memory and the micro-heap allocator state may be relocated without serialization and/or deserialization.

For example, nodes may be added to a graph and the graph may be migrated to the storage system while maintaining a durable, persistent version of the graph. Operations on the graph may be migrated and the data in the graph may be manipulated in the storage system, without performing any serialization and/or deserialization. In another example, a standard list in C++ may be populated on a local node and pushed to the storage system for executing operations on the list in the storage and brought back, without performing any serialization and/or deserialization.

In one embodiment, all the memory used by the data structure is managed by the micro-heap allocator. For example, all pointers and/or spaces of the data structures are allocated by the micro-heap allocator. Operations to the data structure may be easily performed on the micro-heap of the data structure. In a preferred approach, the micro-heaps are loaded into the same region of virtual memory. In one embodiment, memory is provided to micro-heaps is in the form of coarse-grained chunks.

Operation 606 includes storing the data structure in a key-value store, wherein the values of the key-value store are associated the data structures. In preferred embodiments, each micro-heap (and the associated data structure) is directly mapped into the value space of the key-value pair, thereby storing the data structure in a key-value store. Any associated pointers and/or spaces of the data structure are allocated by the micro-heap allocator. All of the micro-heaps are preferably loaded into the same region of maintained memory. Memory space is preferably maintained for both the meta-data associated with the micro-heap allocator and allocated data associated with the data structure in a contiguous region of the memory space.

The fundamental advantage of mapping the micro-heaps directly into the value space of a key-value pair is that the memory corresponding to the data structure is identified without traversing pointers, etc. Data structures may be stored in a key-value store, or any storage known in the art, without serialization or deserialization in accordance with any of the embodiments described herein.

In some approaches, migrating (e.g., relocating) data structures does not include serializing the data of the data structures. In conventional systems, to relocate a data structure, a traversal is performed over the nodes in addition to serialization and deserialization. According to various operations of the present disclosure, migrating data structures includes migrating the micro-heap allocator (e.g., meta-data associated with the micro-heap allocator). For transparent migration of pointer-based allocators, micro-heaps are reloaded into the same virtual address space. Global virtual address allocation may be used to coordinate virtual memory.

In various embodiments, a "root" pointer is used to create a logical grouping of data structures in the micro-heap. For example, in a list, the root pointer of the list may be the head of the list. In another example, to migrate a micro-heap comprising a plurality of data structures and use the data structures, the root pointer in a forest of trees may be the vector of the roots of each of the trees.

In some embodiments, micro-heaps may reserve space for undo and/or redo logs. In persistent memory, it may be desirable to have data structures which are resilient against power failures and/or reset events. For example, a power failure and/or reset events during an insertion operation may result in a partially fixed list (e.g., inconsistent data). Undo logs make copies of the data structure (e.g., a list) before manipulation of the data structure and delete the copy once the manipulation is performed. In response to a power failure and/or reset event during the manipulation, the system may save the consistent copy in favor of the inconsistent data. Redo logs record the changes as the manipulations occur for applying the changes that were committed but not implemented before the power failure and/or reset event. Micro-heap allocators as described herein may allocate memory for undo and/or redo logs as would be understood by one having ordinary skill in the art in view of the present disclosure.

Meta-data for the micro-heap is preferably stored in the managed regions of memory. Meta-data may define the managed regions of memory which are contiguous regions of memory. Allocation by the micro-heap allocator includes identifying free regions within the micro-heap. For example, to allocate n-bytes, a micro-heap allocator identifies a hole that fits those n-bytes. Specifically, a 10 byte or greater hole may be allocated for 8 bytes. 8 bytes may be marked as used and the remaining bytes (2 bytes) may be marked as free (e.g., unallocated). In another example, for a tree-based micro-heap allocator, a new tree node may be allocated for each new allocation. In preferred embodiments, the micro-heap allocator tracks allocated and/or unallocated memory.

In another embodiment, new coarse-grained allocations may be added by linking together allocators (e.g., linked heaps). In one example, a heap allocator based on a log may run out of memory and request new memory from the central heap allocator to create another micro-heap and expand the amount of memory available to the micro-heap allocator. The number of holes and/or the total region footprint may be optimized to improve the performance of relocation where the linked micro-heaps may be moved without allocating memory space.

In some embodiments, the micro-heap allocators may be simplified due to non-sharing (i.e., the micro-heap allocators do not need to be optimized for concurrency).

An advantage of the various embodiments disclosed herein is that the micro-heaps may be tailored to the specific data structure. For example, immutable data structures may be associated with a log-based micro-heap allocator. Immutable data structures may include data structures where memory does not need to be freed and/or reused. In these data structures, allocation of new memory may be performed using the simple, log-based micro-heap allocator. In an exemplary configuration, a data structure is a dictionary in the form of a list. An immutable log-based micro-heap allocator may be preferred where new words (e.g., data instances) are added to the dictionary and existing words are not removed. If the data is immutable, the micro-heap allocator may be simplified on a per-data structure basis thereby improving the efficiency and performance relocating and/or copying data structures.

In one example, for write-once, read-many workloads, a log-based allocator design may be preferred. A log-based micro-heap allocator may be created by moving forward a tail pointer in allocated memory. The "area" managed by the allocator is the area between the head pointer and the tail pointer. Multiple log-based allocators may be associated with the same value space. A log-based micro-heap allocator is extremely high performance and may be easily made concurrent-safe with atomic pointer operations as would be understood by one having ordinary skill in the art upon reading the present disclosure.

In various embodiments, the operations of method 600 may be performed on a client side and/or on a storage side. An arbitrary pointer-based data structures may be used on the client side and/or a storage side for eliminating serialization, deserialization, conversion, etc.

Figure 7:
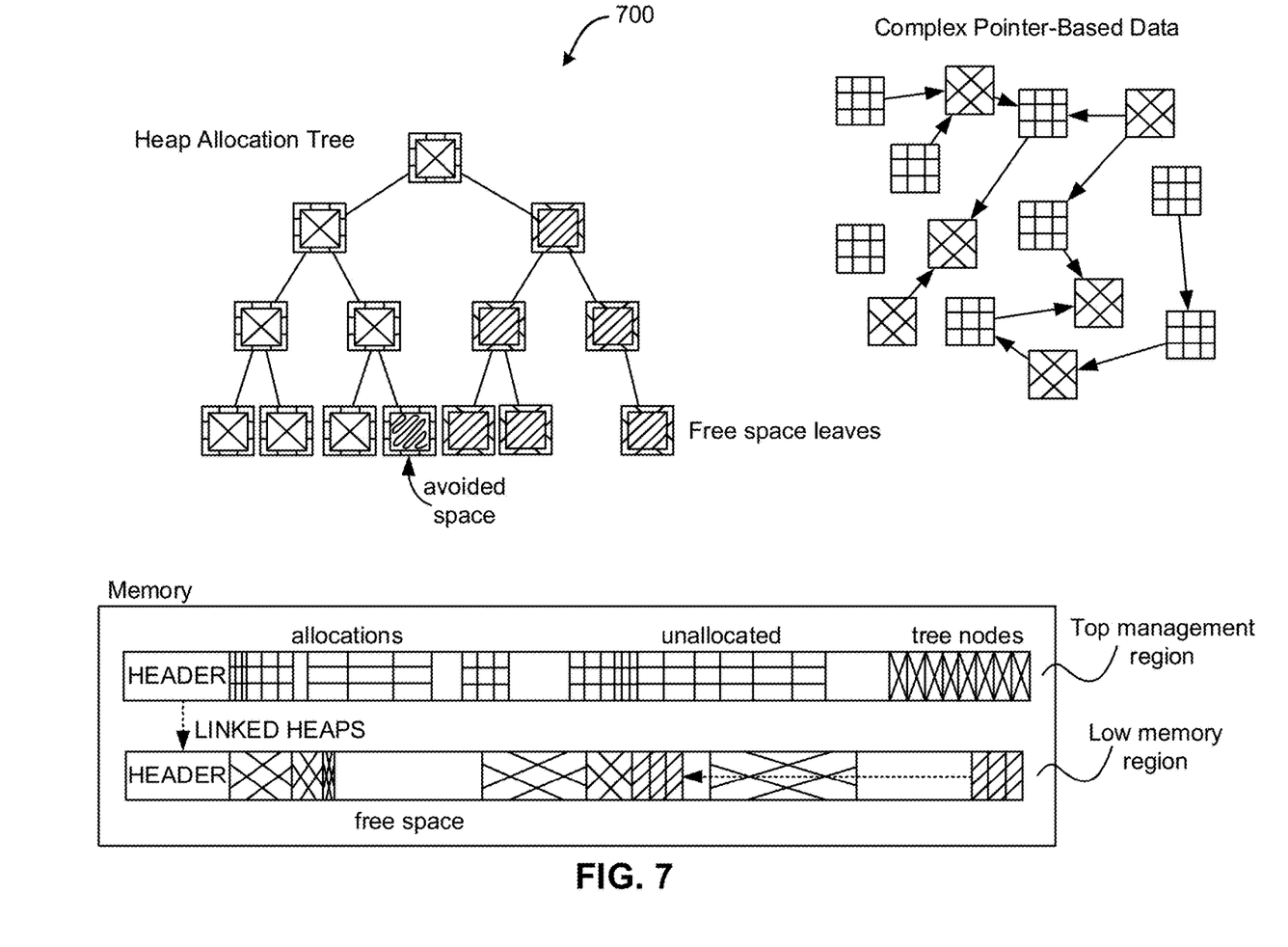
FIG. 7 depicts an exemplary implementation of a binary tree-based micro-heap allocator, in accordance with one embodiment of the present invention.

FIG. 7 depicts an exemplary implementation 700, in accordance with one embodiment. As an option, the present exemplary implementation 700 may be implemented in conjunction with features from any other embodiment listed herein, such as those described with reference to the other FIGS. Of course, however, such exemplary implementation 700 and others presented herein may be used in various applications and/or in permutations which may or may not be specifically described in the illustrative embodiments listed herein. Further, the exemplary implementation 700 presented herein may be used in any desired environment.

According to various embodiments described in detail above, micro-heap allocators may comprise characteristics of any allocator design known in the art. For many typical allocation workloads, a tree-based micro-heap allocator may be suitable. In preferred approaches, binary trees (e.g., B+ trees) are used. In exemplary implementation 700, a binary tree-based micro-heap allocator is used. The tree maintains an ordered set of "freed regions" (e.g., free space leaves) ordered by size. Tree nodes determine the largest hole in their children. The leaves represent actual free regions (e.g., free space leaves) in the micro heap. Allocations are made by finding a free "hole" to carve out an allocation. In one approach, the heap allocation tree may be a first-fit allocation tree for fastest allocation strategy although first-fit allocation may result in fragmentation. In another approach, the heap allocation tree may be a best-fit allocation tree although best-bit allocation may be relatively time consuming compared to a first-fit allocation tree. The type of allocation tree and/or allocator design may be assigned to the micro-heap and its associated data structure (e.g., complex pointer-based data) to optimize any threshold requirements set by a user, a manufacturer, a default setting, etc. The complex pointer-based data comprises two fill patterns, each of which denotes a different data structure. Within the heap allocation tree, portions of each of the data structures in the complex pointer-based data are associated with regions of memory which are further denoted by the secondary fill patterns. The nodes within the tree preferably comprise indicators of the maximum size of a hole within the tree. The tree may be used to manage space in any manner known in the art.

In some approaches using micro-heaps, storing the tree nodes may use a "slab allocator." Slab allocators may be expanded by linking the micro-heaps together according to any of the embodiments described in detail above. Space for slab allocators may be dynamically allocated and/or directly made part of the tree. In an alternative approach, a strategy of using "upper-memory" when possible may avoid linking sub-slab allocators together (avoided space).

The tree is used to manage the holes. In some embodiments, meta-data defines which region comes from continuous ranges in addition to defining which regions are allocated and which regions are unallocated. To create an instance of data, the heap allocation tree is modified and creates new nodes in the tree. Additionally, the data is allocated for the tree itself. Memory is allocated for the nodes in the graph (e.g., the data structure). Some nodes are allocated on the top management region and some nodes are allocated on the low memory region, as shown. The meta-data is also allocated into the managed regions.

In response to a single managed region running out of holes for new data instances, a second micro-heap may be linked to the first micro-heap such that the tree managing the bottom layer is linked at the root of the heap allocation tree.

In various approaches, bit-maps may be used to assign free memory (free space) and/or allocate memory to be managed by the micro-heap allocator. In some approaches, a predefined amount of memory may be saved for tree node data. For example, the memory may be mapped out as a void at the far end of a region to keep as much of the allocated memory space for the tree node data together to minimize the fragmentation. To relocate a graph associated with these regions, the memory for these regions in the micro-heaps is moved.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
receiving data structures in memory space;
creating micro-heaps on a per-data structure basis, wherein each data structure is associated with a unique micro-heap allocator, wherein each micro-heap includes a micro-heap allocator and the associated data structure; and
storing the data structures in a key-value store, wherein values of the key-value store are associated with the data structures.

2. The computer-implemented method of claim 1, comprising creating secondary micro-heaps on a per logical group basis, wherein a logical group comprises a plurality of data structures.

3. The computer-implemented method of claim 1, comprising relocating the data structures, wherein relocating the data structures includes relocating memory managed by the micro-heap allocators associated with the data structures, wherein the relocating does not include serializing.

4. The computer-implemented method of claim 1, comprising copying the data structures to memory managed by the micro-heap allocator associated with the data structures, wherein the copying does not include serializing.

5. The computer-implemented method of claim 1, wherein each micro-heap is associated with a micro-heap allocator configured for memory management.

6. The computer-implemented method of claim 1, comprising maintaining the memory space, wherein the memory space includes metadata memory space and allocated data memory space in a contiguous region of the memory space.

7. The computer-implemented method of claim 6, comprising expanding the maintained memory space by linking a plurality of micro-heap allocators together.

8. The computer-implemented method of claim 6, wherein the contiguous region of the memory space uses data transfers selected from the group consisting of: direct memory access (DMA) and remote direct memory access (RDMA).

9. A computer program product, the computer program product comprising:
one or more computer readable storage media, and program instructions collectively stored on the one or more computer readable storage media, the program instructions comprising:
program instructions to receive data structures in memory space;
program instructions to create micro-heaps on a per-data structure basis, wherein each data structure is associated with a unique micro-heap allocator, wherein each micro-heap includes a micro-heap allocator and the associated data structure; and
program instructions to store the data structures in a key-value store, wherein values of the key-value store are associated with the data structures.

10. The computer program product of claim 9, comprising program instructions to create secondary micro-heaps on a per logical group basis, wherein a logical group comprises a plurality of data structures.

11. The computer program product of claim 9, comprising program instructions to relocate the data structures, wherein relocating the data structures includes relocating memory managed by the micro-heap allocators associated with the data structures, wherein the relocating does not include serializing.

12. The computer program product of claim 9, comprising program instructions to copy the data structures to memory managed by the micro-heap allocator associated with the data structures, wherein the copying does not include serializing.

13. The computer program product of claim 9, wherein each micro-heap is associated with a micro-heap allocator configured for memory management.

14. The computer program product of claim 9, comprising program instructions to maintain the memory space, wherein the memory space includes metadata memory space and allocated data memory space in a contiguous region of the memory space.

15. The computer program product of claim 14, comprising program instructions to expand the maintained memory space by linking a plurality of micro-heap allocators together.

16. The computer program product of claim 14, wherein the contiguous region of the memory space uses data transfers selected from the group consisting of: direct memory access (DMA) and remote direct memory access (RDMA).

17. A system, comprising:
a processor; and
logic integrated with the processor, executable by the processor, or integrated with and executable by the processor, the logic being configured to:
receive data structures in memory space;
create micro-heaps on a per-data structure basis, wherein each data structure is associated with a unique micro-heap allocator, wherein each micro-heap includes a micro-heap allocator and the associated data structure; and
store the data structures in a key-value store, wherein values of the key-value store are associated with the data structures.

18. The system of claim 17, comprising logic configured to create secondary micro-heaps on a per logical group basis, wherein a logical group comprises a plurality of data structures.

19. The system of claim 17, comprising logic configured to relocate the data structures, wherein relocating the data structures includes relocating memory managed by the micro-heap allocators associated with the data structures, wherein the relocating does not include serializing.

20. The system of claim 17, comprising logic configured to copy the data structures to memory managed by the micro-heap allocator associated with the data structures, wherein the copying does not include serializing.

* * * * *